F. M. CUMMINGS.
TROLLEY WHEEL.
APPLICATION FILED MAR. 16, 1911.
1,020,540.
Patented Mar. 19, 1912.
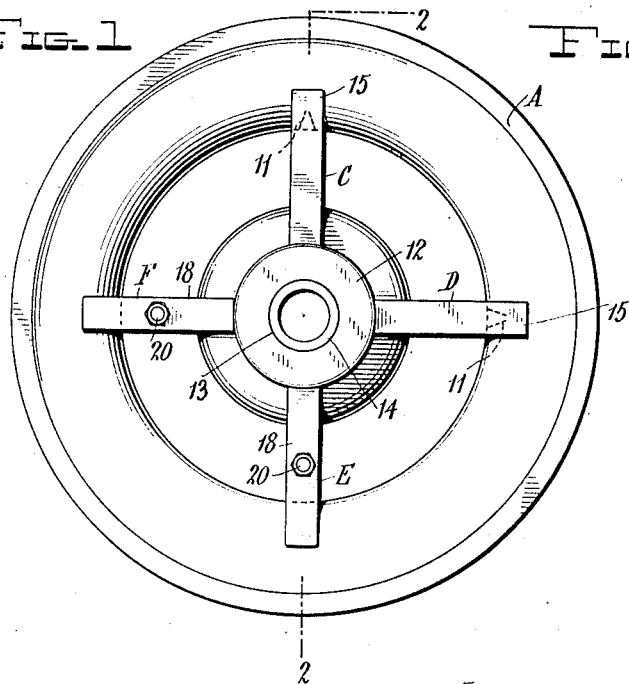
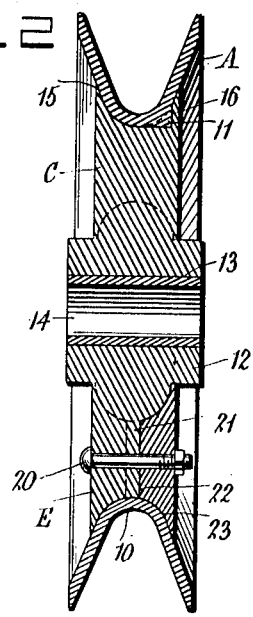
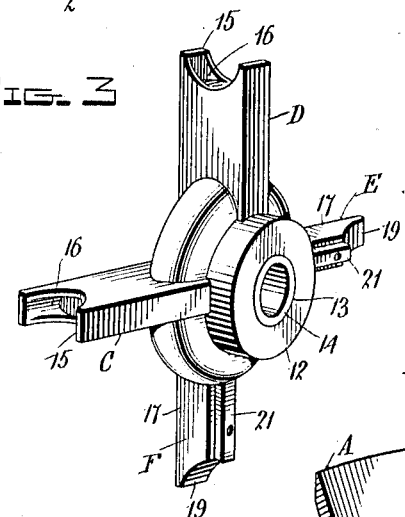
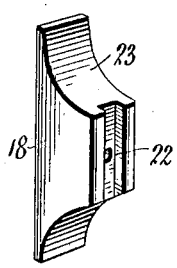
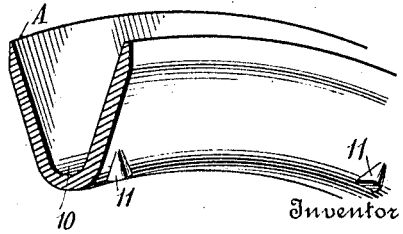
Witnesses
Inventor
Frank M. Cummings
By Henry T. Bright
Attorney

UNITED STATES PATENT OFFICE.

FRANK M. CUMMINGS, OF BYESVILLE, OHIO.

TROLLEY-WHEEL.

1,020,540.  Specification of Letters Patent.  Patented Mar. 19, 1912.

Application filed March 16, 1911. Serial No. 614,892.

*To all whom it may concern:*

Be it known that I, FRANK M. CUMMINGS, a citizen of the United States, residing at Byesville, in the county of Guernsey, State of Ohio, have invented certain new and useful Improvements in Trolley-Wheels; and I do hereby declare the following to be a full, clear, and exact description of the invention, such as will enable others skilled in the art to which it appertains to make and use the same.

This invention relates to trolley-wheels.

The object of the invention resides in the provision of a trolley-wheel in which the rim section is entirely separate and removable from the hub section whereby the rim when worn may be readily removed and replaced by a new one and the necessity of dispensing with the hub section and the resulting expense obviated.

A further object of the invention resides in the provision of a trolley-wheel which will be simple in construction, efficient in use and comparatively inexpensive to manufacture.

With the above and other objects in view the invention consists in the details of construction and in the arrangement and combination of parts to be hereinafter more fully described and particularly pointed out in the appended claims.

In describing the invention in detail reference will be had to the accompanying drawing wherein like characters of reference denote corresponding parts in the several views, and in which—

Figure 1 is a side elevation of a trolley-wheel constructed in accordance with the invention, Fig. 2; a section on the line 2—2 of Fig. 1, Fig. 3; a detail perspective view of the hub section of the wheel which includes a central bearing and a plurality of radial spokes, Fig. 4; a detail perspective view of one of the detachable sections which is secured to certain respective spokes of the hub section to positively lock the latter and the rim against disengagement from each other and Fig. 5; a detail perspective view of a fragment of the rim.

Referring to the drawings A indicates the rim of the wheel which is formed of one piece and has its periphery provided with the usual valley 10 for receiving the conducting wire. The rim A is provided near its inner portion with spaced lugs 11 for a purpose that will presently appear.

The hub section of the wheel comprises a bearing 12 having a central opening 13 in which is disposed the usual bushing 14. Radiating from the bearing 12 is a plurality of spokes C, D, E and F. The spokes C and D are formed in one piece and are preferably integral with the bearing 12. The outer ends of the spokes C and D are respectively forked as at 15 and the arms of these forked ends embrace the rim A. The ends of the spokes C and D are further provided respectively with recesses 16 in which the lugs 11 are adapted to respectively seat when the rim and hub sections are in assembled relation to prevent relative rotation between said sections. Each of the spokes E and F is formed of a pair of sections 17 and 18 the former of which is preferably integral with the bearing 12 and has its outer end provided with a radially and laterally opening recess 19 in which the rim A seats. This recess 19 is so positioned that the section 17 bears at its outer end against only one side of the rim A. The section 18 of each of the spokes E and F is detachably secured to the respective sections 17 by means of a suitable connection 20 and said sections are further held against relative movement by means of a tongue 21 on the section 17 which removably seats in a groove 22 in the section 18. The outer end of the section 18 is provided with a lateral and radial opening recess 23 disposed opposite to the recess 19 and so positioned that the outer end of the section 18 bears against the side of the rim A opposite to that engaged by the outer end of the section 17.

By this construction it will be apparent that when the rim A has become worn to such an extent as would impair the efficiency of the wheel, it is only necessary to detach the sections 17 and 18 of the spokes E and F when certain portions of the rim and hub sections can be moved laterally away from each other and permit complete disengagement and separation of said hub and rim sections. After this is done a new rim can be applied to the hub section and locked in place by the reapplication of the sections 17 and 18 of the spokes E and F.

While I have described one particular form of carrying my invention into practice it will be noted that many changes in the details of construction of the various parts of the wheel may be resorted to without in any manner departing from the scope of the invention as set forth in the appended claims.

I claim:

1. A trolley-wheel comprising a rim provided with spaced lugs, a hub having a plurality of spokes, certain of said spokes being formed of one piece integral with the hub and having forked outer ends loosely embracing the rim, and provided with recesses in their forked outer ends in which the lugs on the rim respectively seat whereby the hub and rim are locked against relative rotation, and the remainder of said spokes being provided with laterally and radially opening recesses in their outer ends respectively in which the rim seats, and detachable clamping means for holding the rim against movement out of the recesses in the second named spokes.

2. A trolley-wheel comprising a rim, a hub, a plurality of spokes connecting the hub and rim, certain of said spokes being formed of one piece integral with the hub and having forked outer ends embracing the rim, and each of the remainder of said spokes being formed of a pair of radially-disposed sections one of which is rigidly secured to the hub and bears against one side of the rim at its outer end, the other of said sections having a longitudinal groove in its inner face and bearing at its outer end against the other side of the rim, a tongue on the inner face of the first named section seating in the groove in the second named section, and means for detachably securing said sections together.

In testimony whereof, I affix my signature, in presence of two witnesses.

FRANK M. CUMMINGS.

Witnesses:
JOHN O. CARNES,
S. C. CARNES.

---

Copies of this patent may be obtained for five cents each, by addressing the "Commissioner of Patents, Washington, D. C."